J. F. MEIGS & R. P. STOUT.
AMMUNITION HOISTING MECHANISM.
APPLICATION FILED MAR. 23, 1908.
1,084,947.
Patented Jan. 20, 1914.
Fig. 2.ª
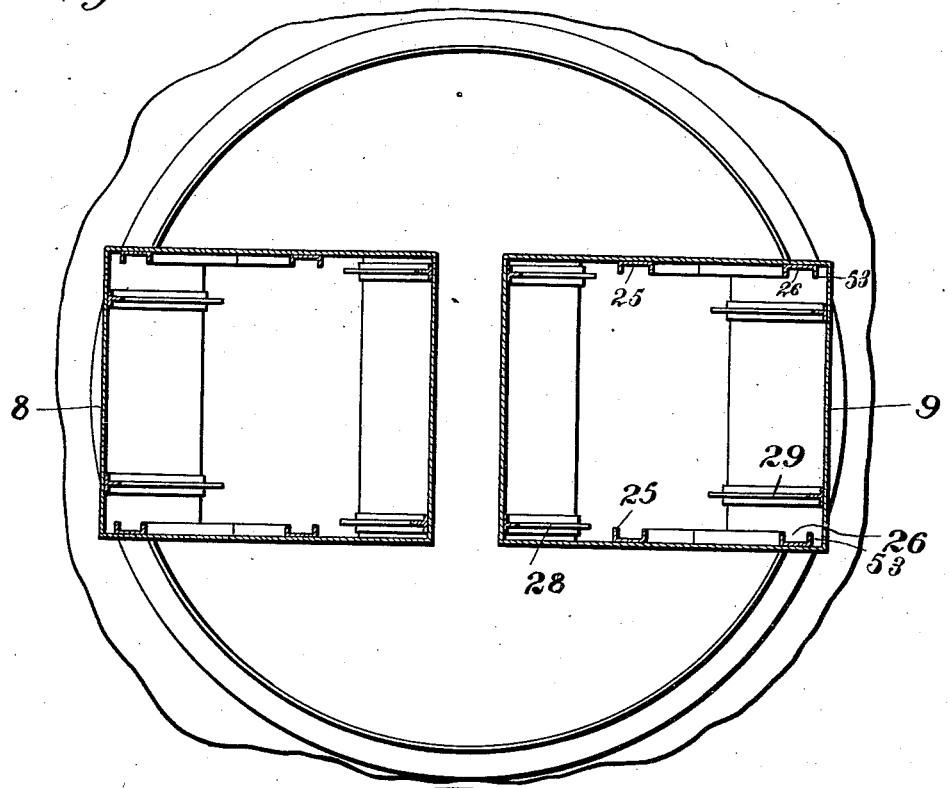
Fig. 2.ᵇ
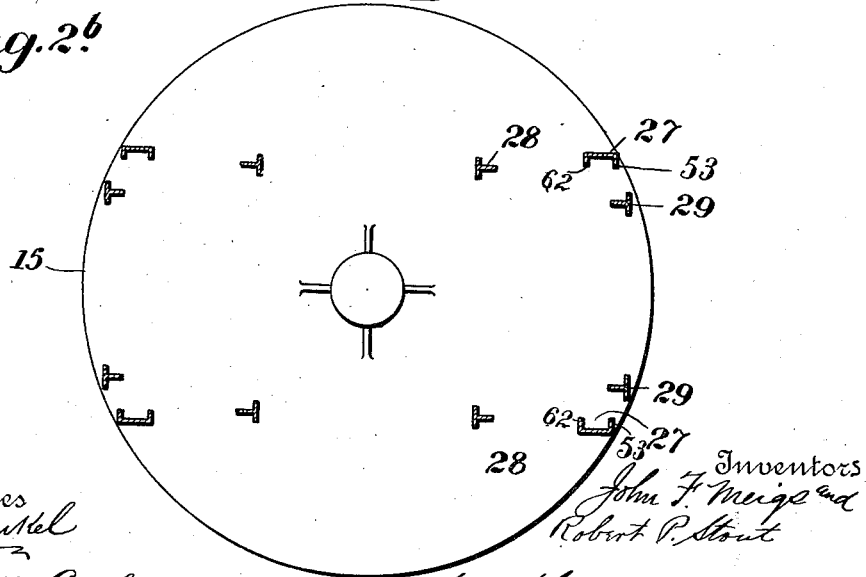
Witnesses
J. G. Stinkel
J. J. McCarthy
Inventors
John F. Meigs and
Robert P. Stout
By Foster Freeman Watson Coit
Attorneys J. F. MEIGS & R. P. STOUT.
AMMUNITION HOISTING MECHANISM.
APPLICATION FILED MAR. 23, 1908.
1,084,947.
Patented Jan. 20, 1914.
12 SHEETS—SHEET 4.
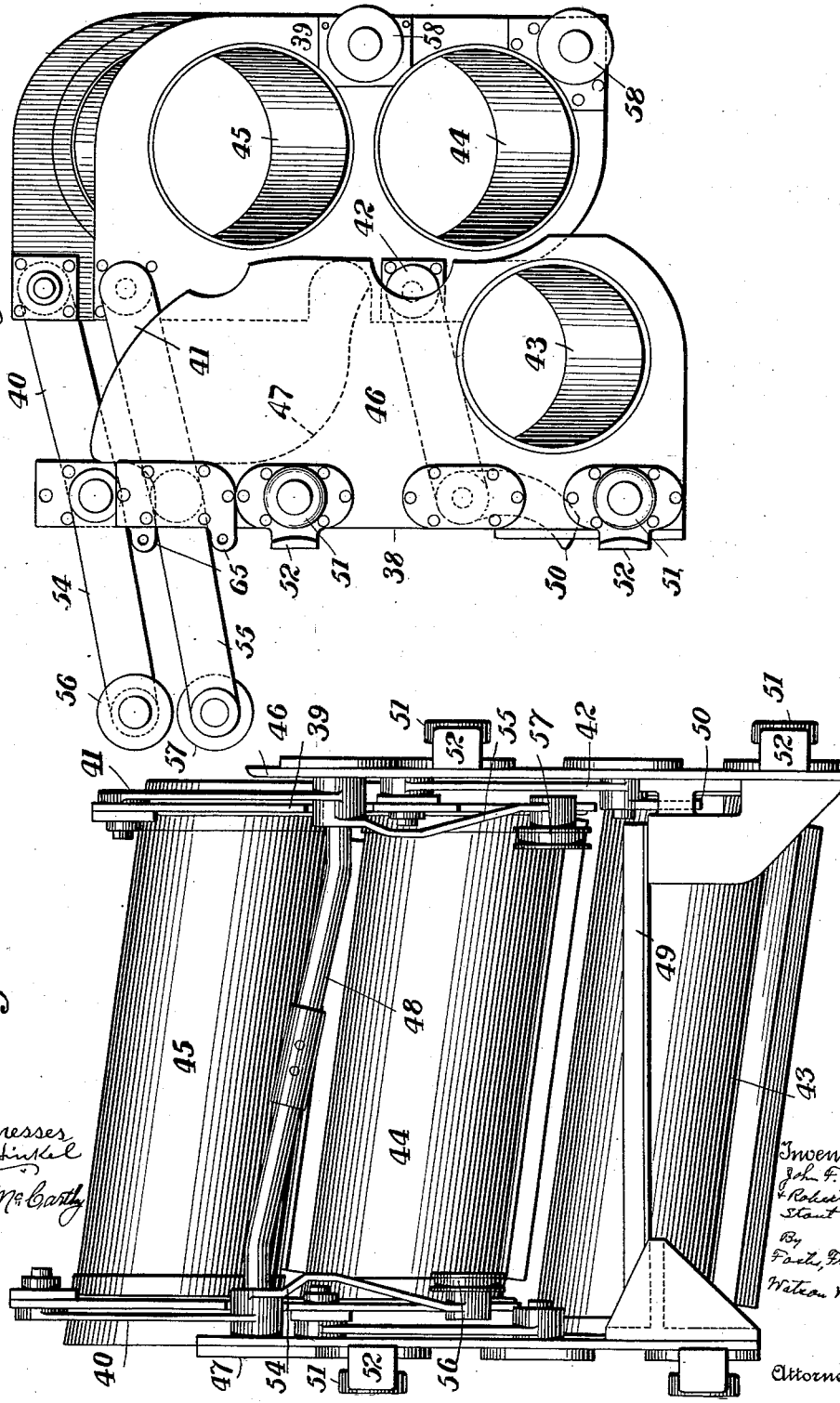

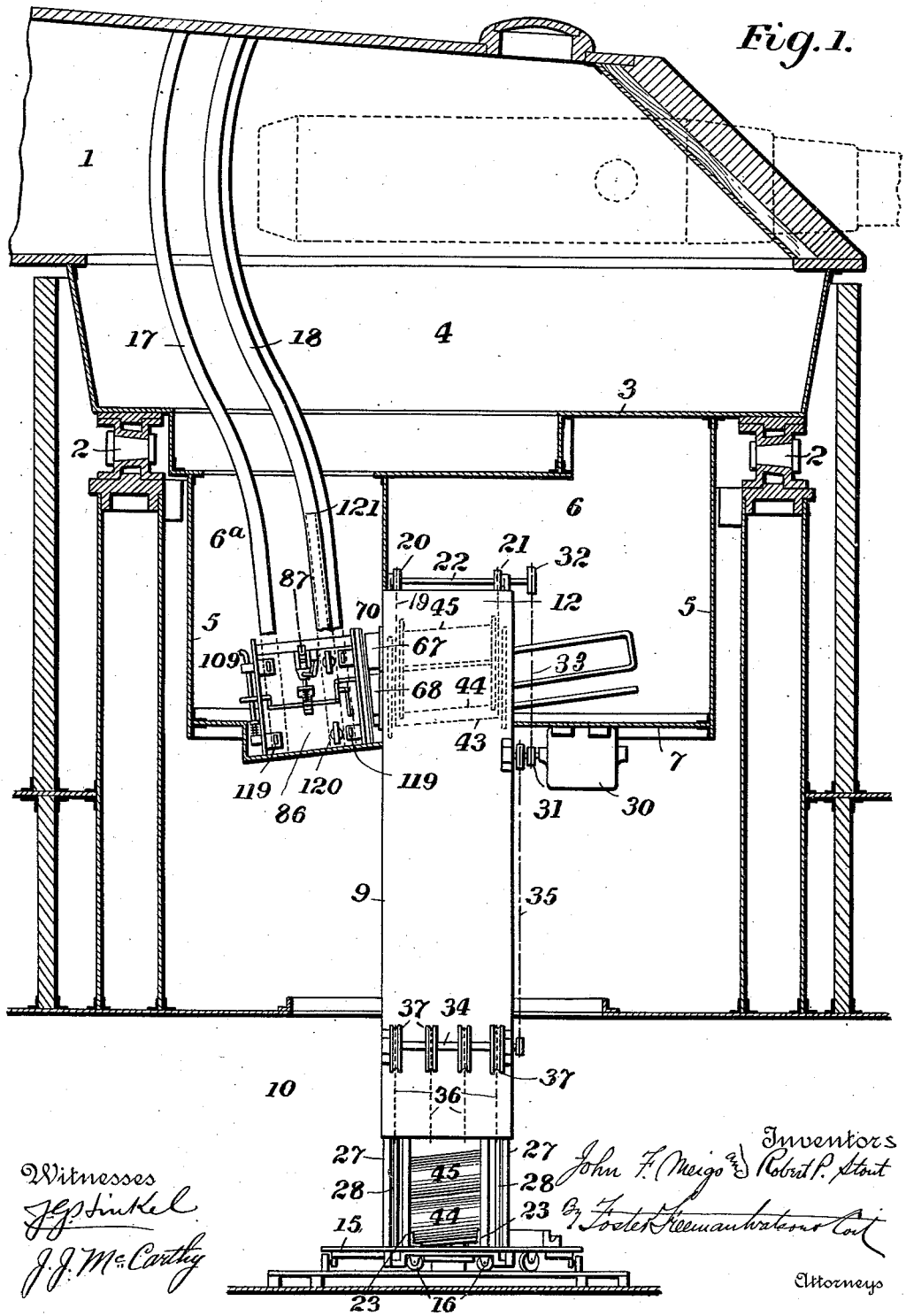

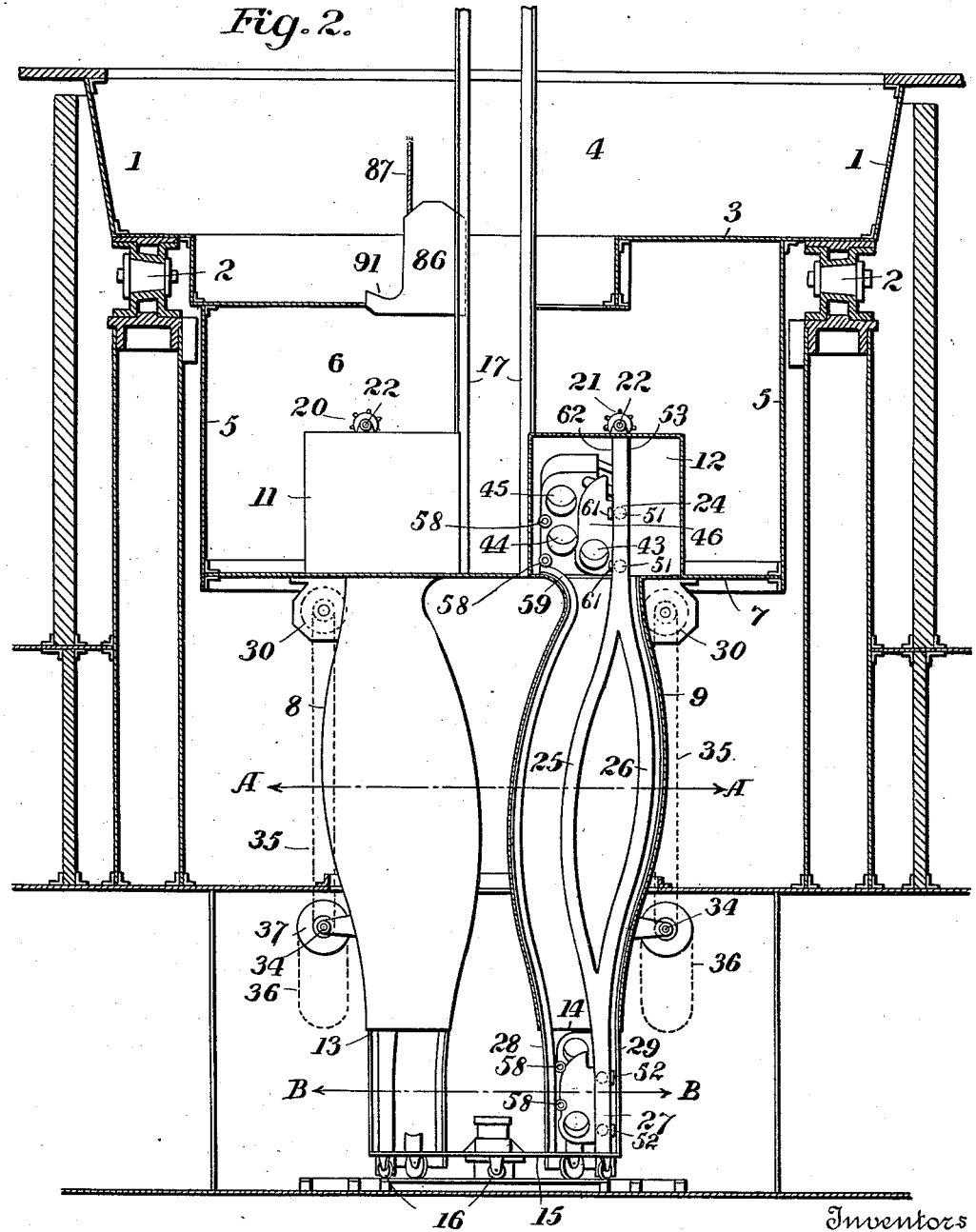

J. F. MEIGS & R. P. STOUT.
AMMUNITION HOISTING MECHANISM.
APPLICATION FILED MAR. 23, 1908.
1,084,947.
Patented Jan. 20, 1914.
12 SHEETS—SHEET 5.
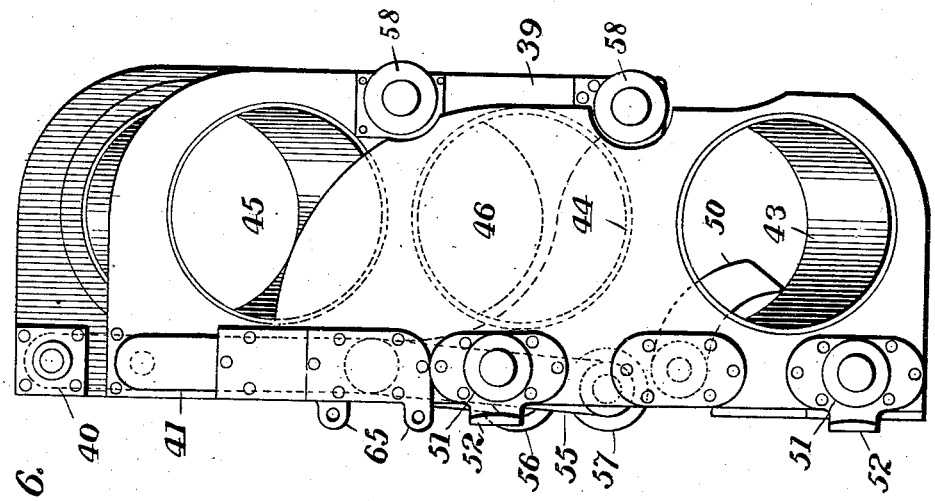
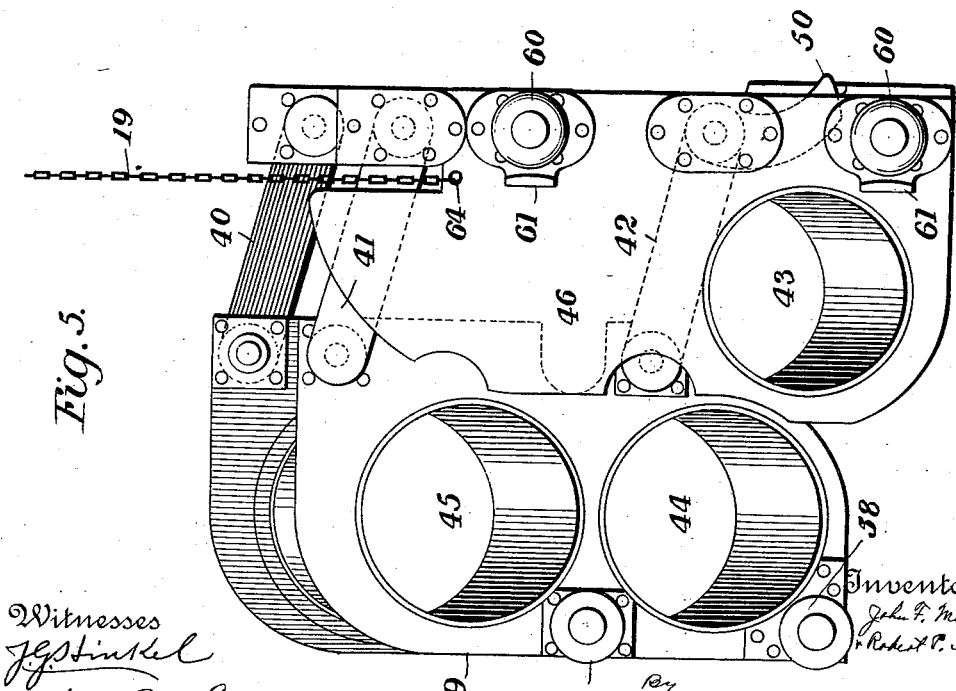

J. F. MEIGS & R. P. STOUT.
AMMUNITION HOISTING MECHANISM.
APPLICATION FILED MAR. 23, 1908.
1,084,947.
Patented Jan. 20, 1914.
12 SHEETS—SHEET 6.
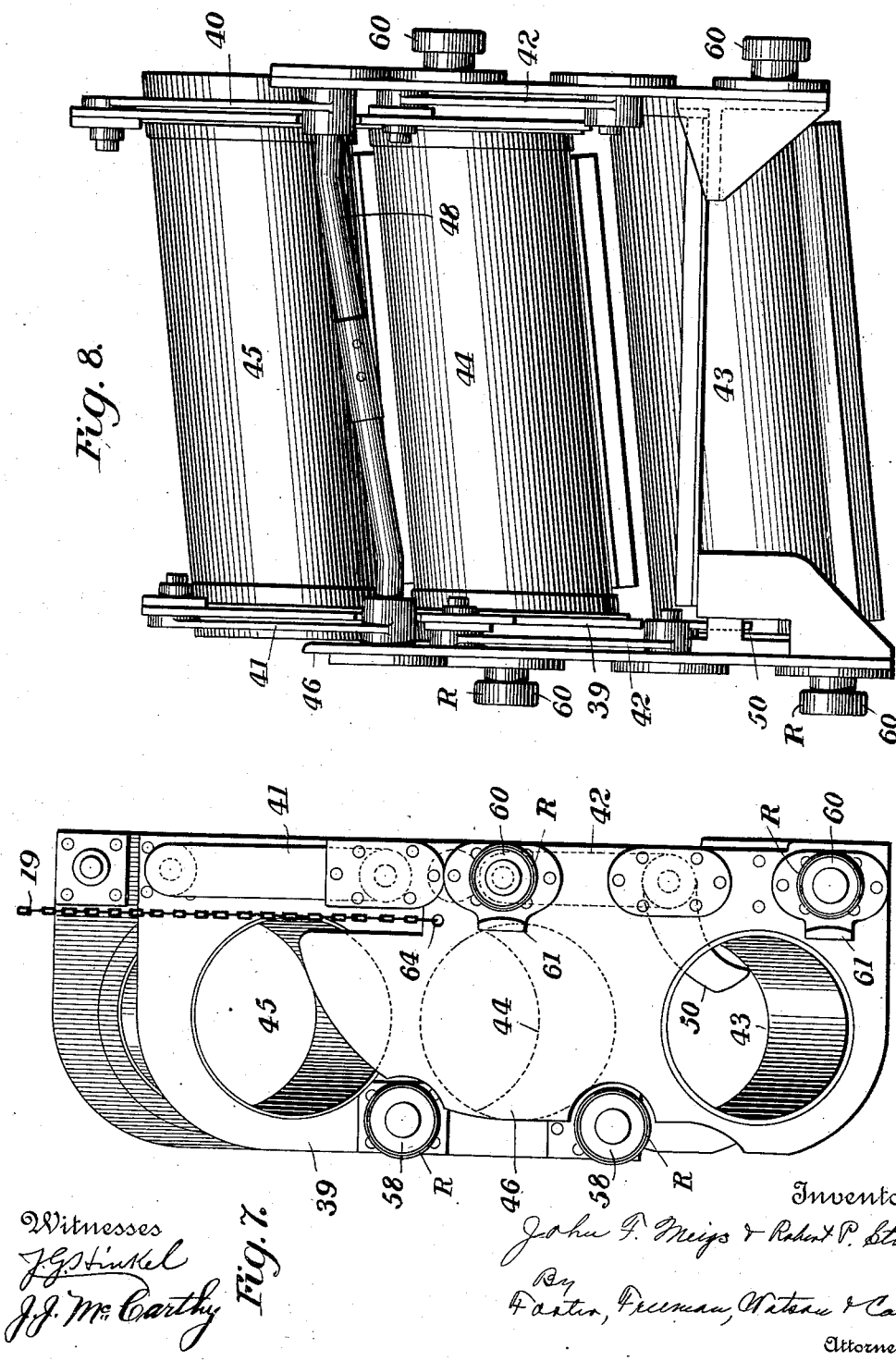

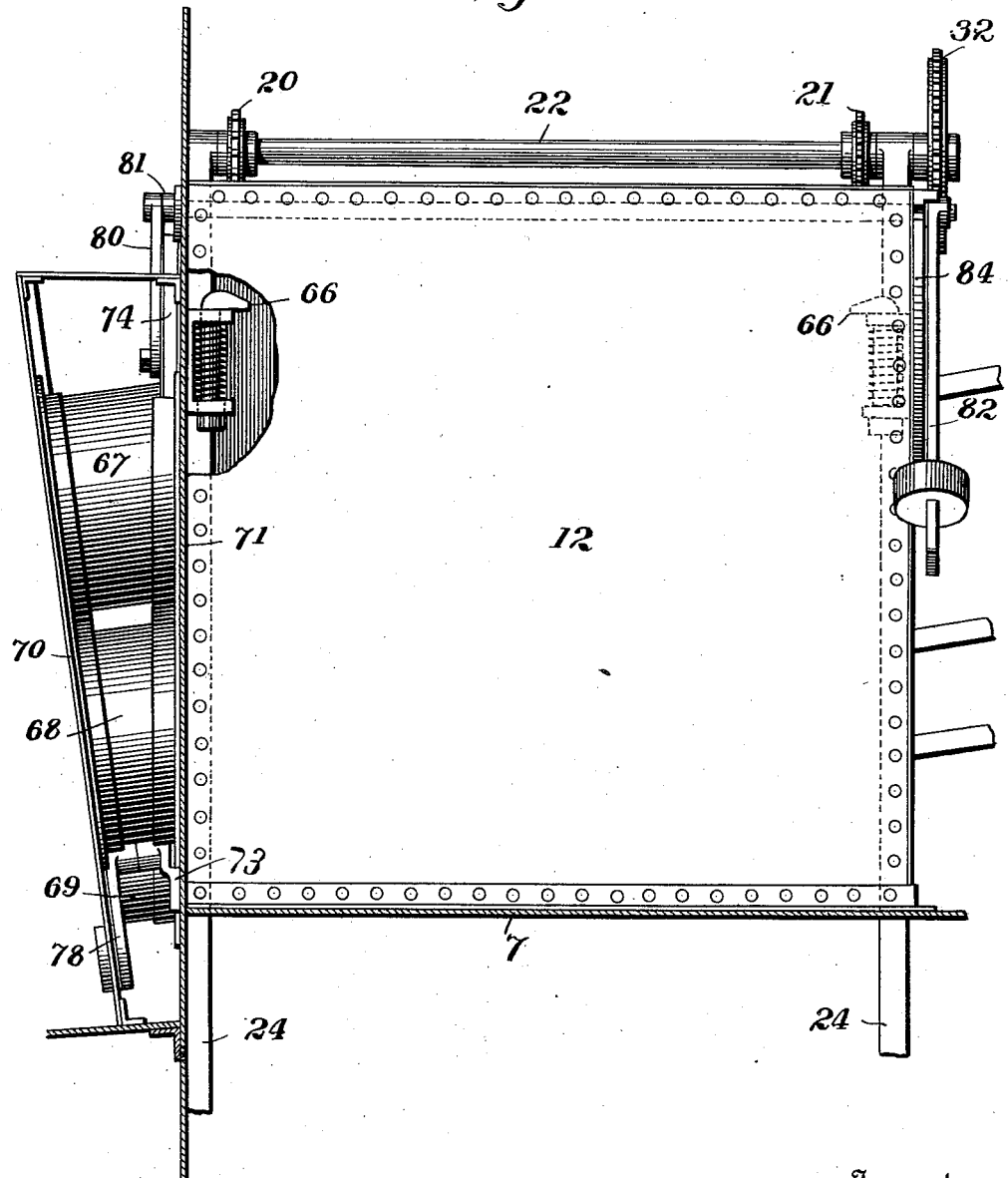

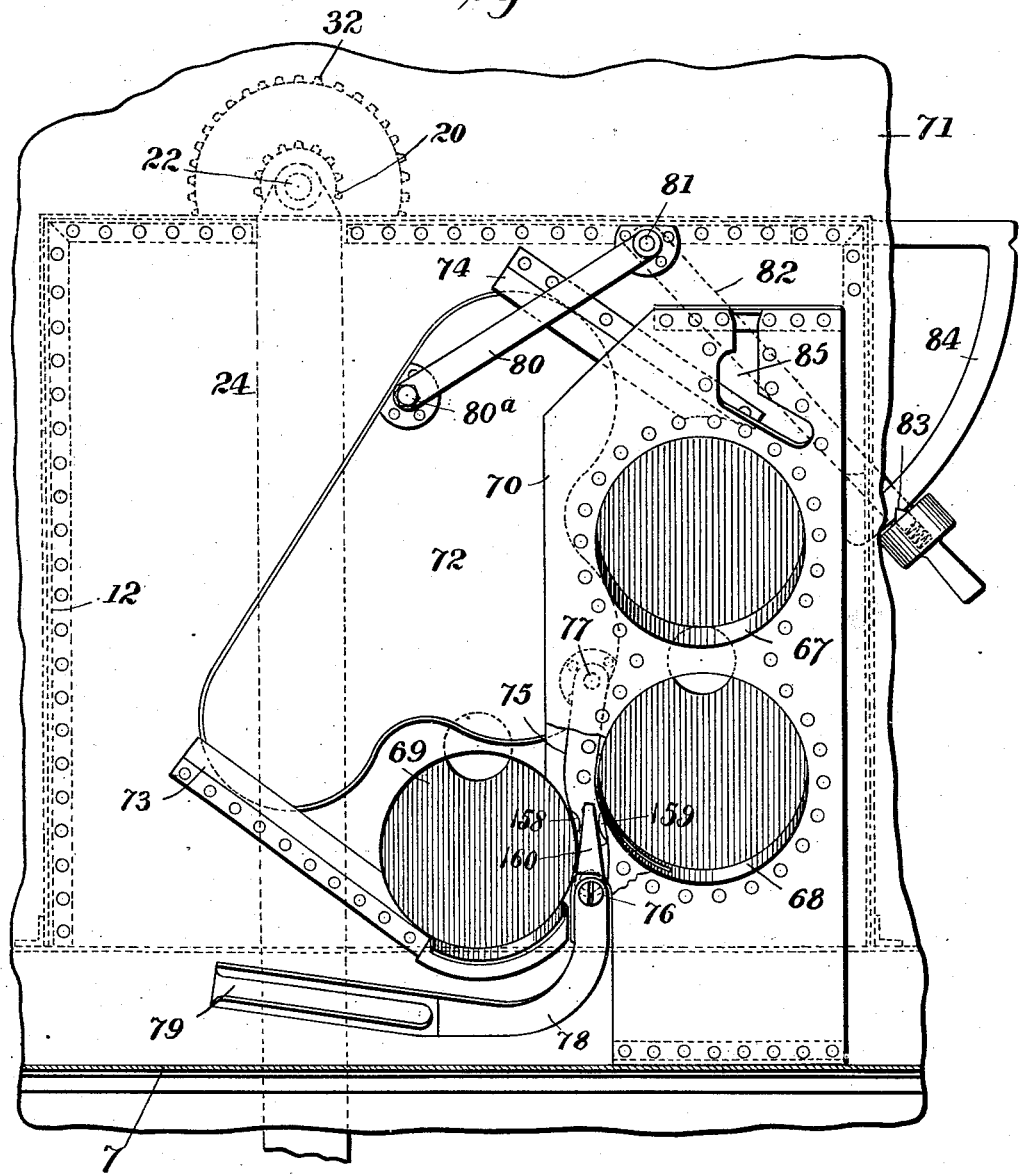

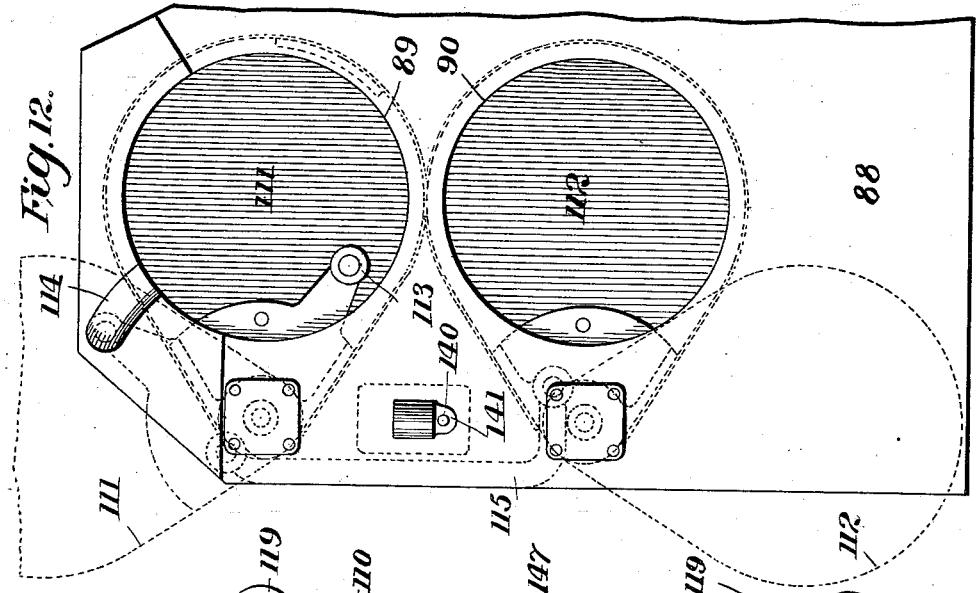

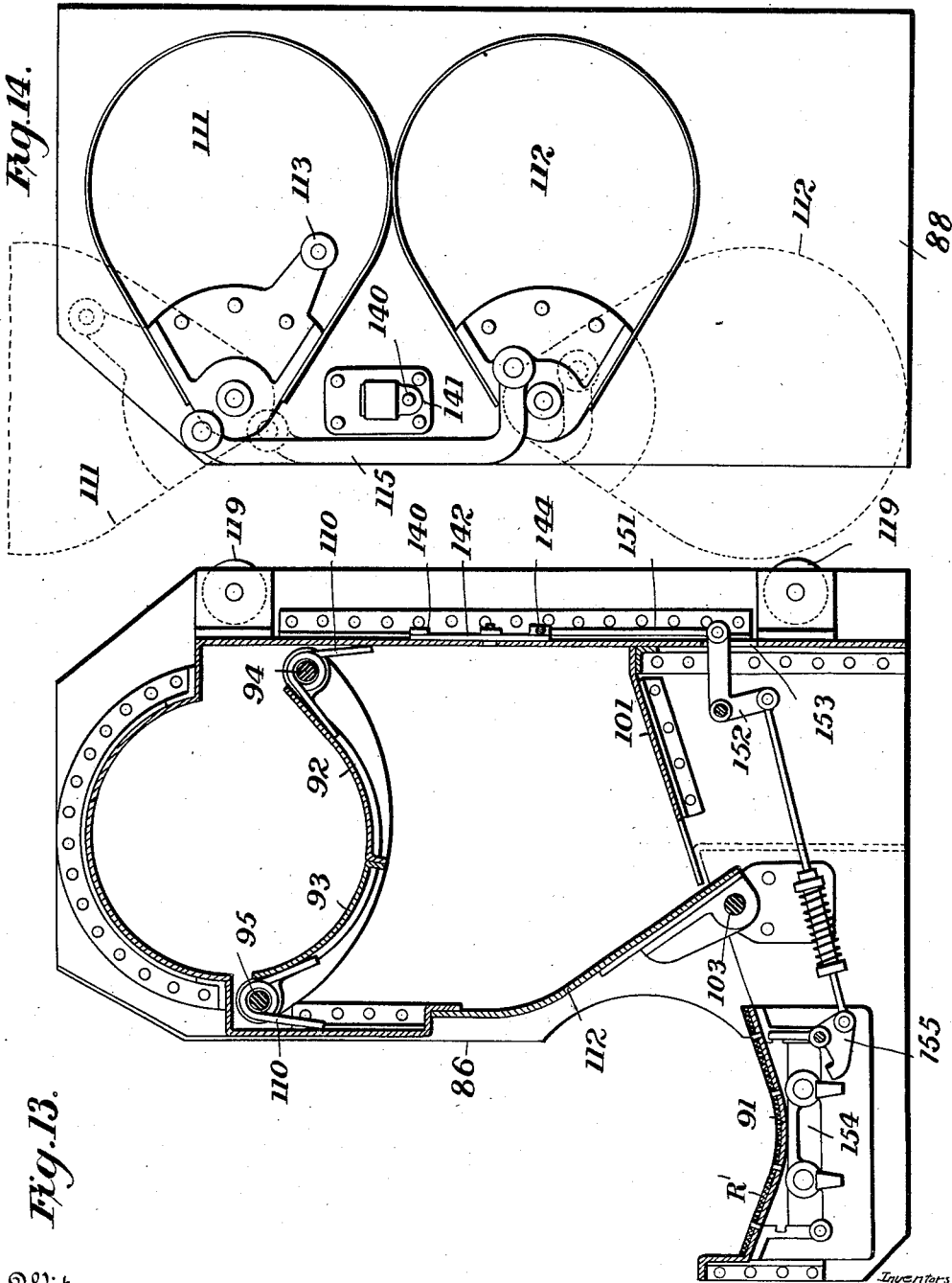

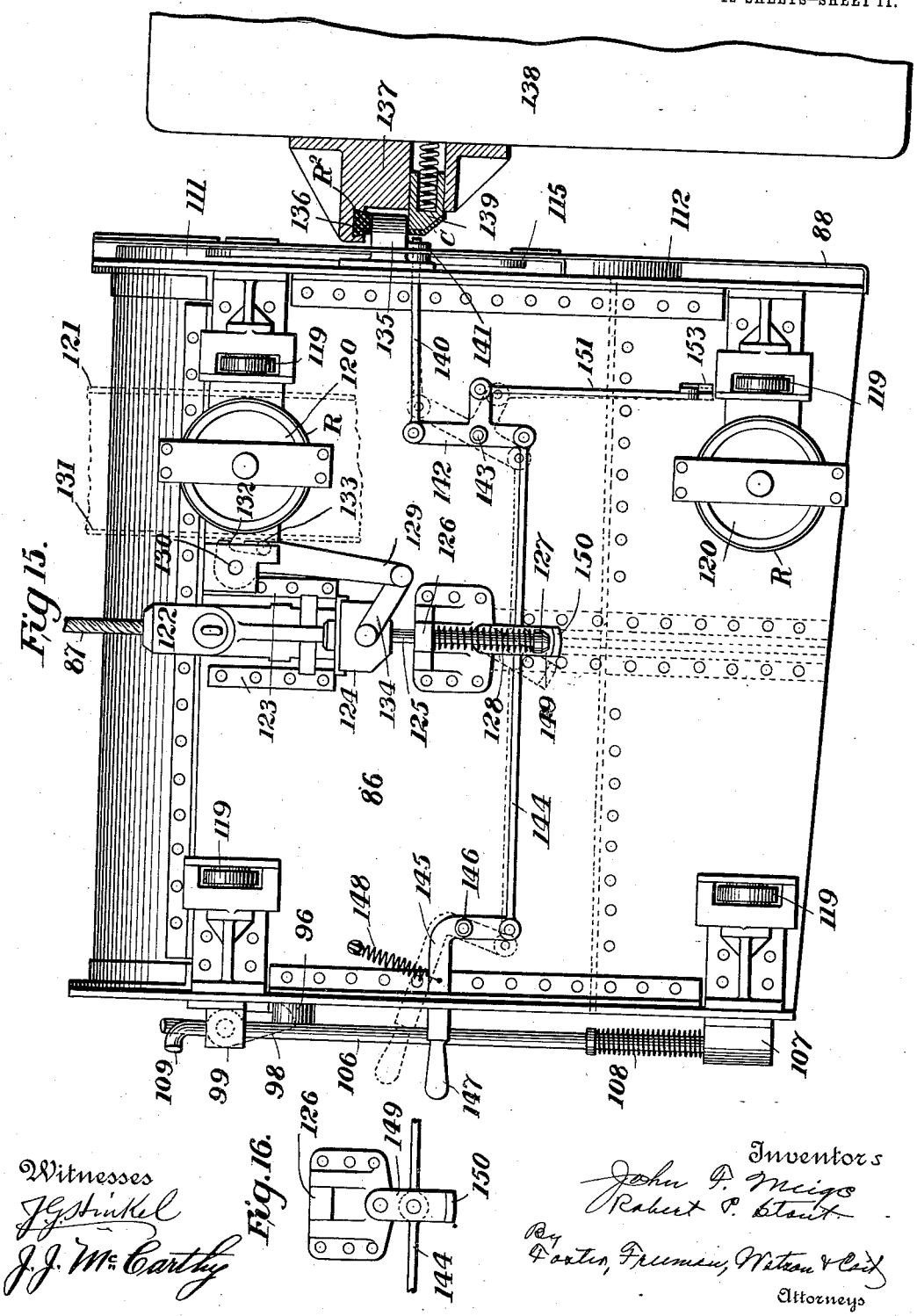

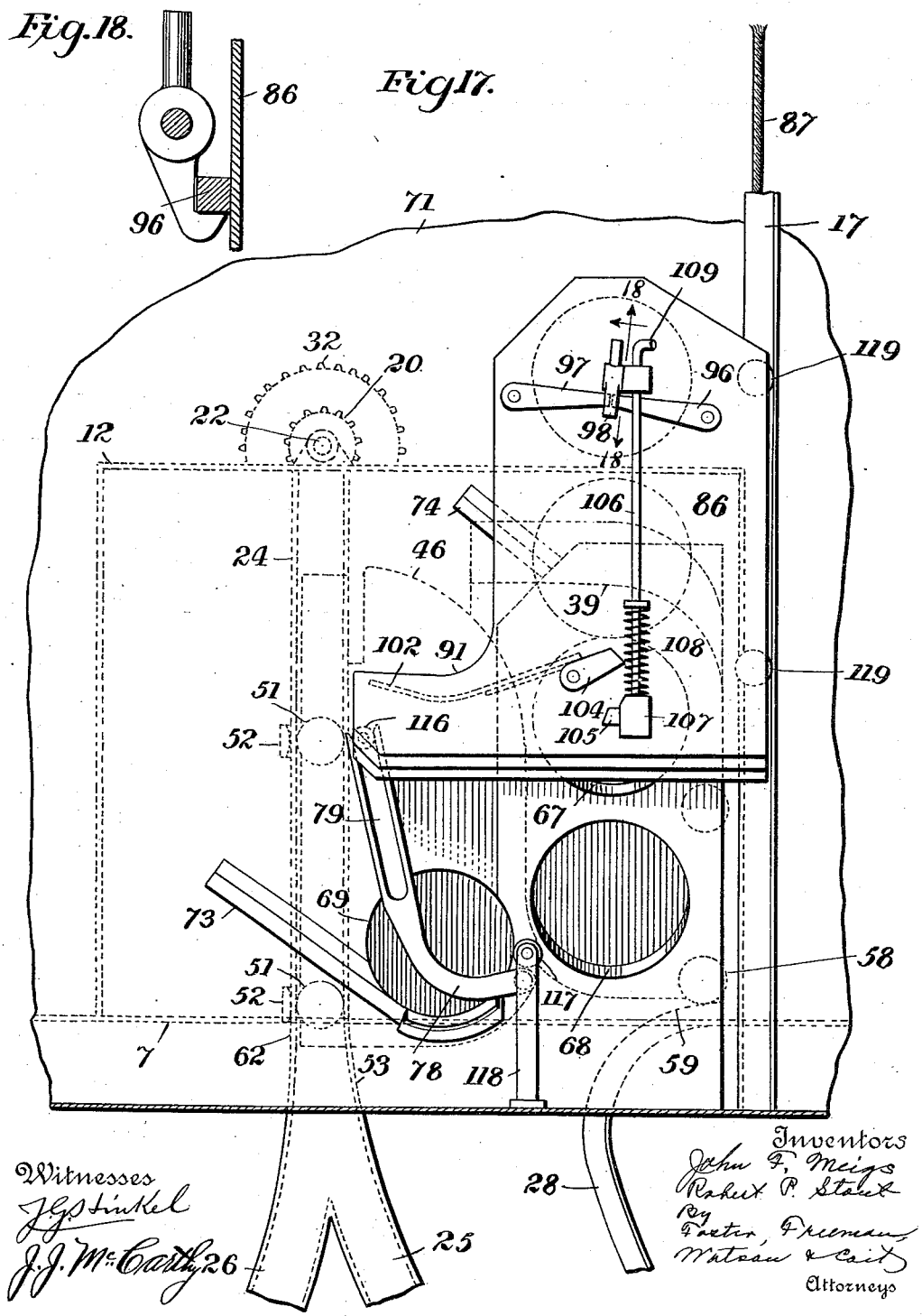

UNITED STATES PATENT OFFICE.

JOHN F. MEIGS AND ROBERT P. STOUT, OF SOUTH BETHLEHEM, PENNSYLVANIA, ASSIGNORS TO BETHLEHEM STEEL COMPANY, OF SOUTH BETHLEHEM, PENNSYLVANIA, A CORPORATION OF PENNSYLVANIA.

AMMUNITION-HOISTING MECHANISM.

1,084,947.      Specification of Letters Patent.      Patented Jan. 20, 1914.

Application filed March 23, 1908. Serial No. 422,741.

*To all whom it may concern:*

Be it known that we, JOHN F. MEIGS and ROBERT P. STOUT, citizens of the United States, residing at South Bethlehem, Northampton county, State of Pennsylvania, have invented certain new and useful Improvements in Ammunition-Hoisting Mechanism, of which the following is a specification.

This invention relates to improvements in ammunition hoisting mechanism and is intended primarily for use upon war vessels. Its objects are to secure greater simplicity and compactness of structure and ease of operation in handling ammunition and to provide greater safety against explosions.

The invention includes means whereby communication between the turret and the magazine is cut off at all times, whereby an absolute safeguard against the passage of sparks or flame from the turret to the magazine at any time is provided, even during the transfer of ammunition.

It also includes means for preventing any exposure of the powder charges to sparks and flame which may come from the gun until the charges are in position to be rammed into the gun.

Other novel features will be apparent from the following description and claims taken with the accompanying drawings, in which, Figure 1 is a view partly in section showing the lower part of a revolving turret for a war vessel having our invention applied thereto and the handling room below the turret; Fig. 2 is a similar view taken at right angles to Fig. 1; Figs. 2ª and 2ᵇ are sections on the lines A, A and B, B of Fig. 2; Fig. 3 is a side elevation of one of the lower hoist cars; Fig. 4 is an end elevation of the same car shown in its open position; Fig. 5 is an end elevation of another one of the lower hoist cars; Fig. 6 is an end elevation of the car shown in Figs. 3 and 4 when folded or closed; Fig. 7 is an end elevation of the car shown in Fig. 5 when folded; Fig. 8 is a side elevation of said car; Fig. 9 is a side view partly broken away of the transfer chamber; Fig. 10 is an end elevation of the transfer chamber with the door for said chamber open; Fig. 11 is an end elevation of the upper hoist car; Fig. 12 is a similar view looking from the opposite end; Figs. 13 and 14 are sectional elevations of the upper hoist cars corresponding respectively to Figs. 11 and 12; Fig. 15 is a side elevation of the upper hoist car in position at the breech of the gun; Fig. 16 is a detail of parts shown in Fig. 15; Fig. 17 is a side elevation of the transfer chamber and upper car approaching it, and shows the lower car in dotted lines; Fig. 18 is a section on the line 18—18 of Fig. 17.

In the drawings 1 represents the lower part of the turret of a war vessel which is adapted to rotate on the rollers 2, and which carries with it in its rotation all of the parts of the present invention. The bottom wall 3 of the gun chamber 4 has suspended therefrom the walls 5 of the upper handling or transfer room 6, and the bottom wall or floor 7 of this transfer room has suspended therefrom the inclosed passage ways or tubes 8 and 9 leading down to the magazine or lower handling room 10. Supported by the floor 7 over the upper ends of the tubes 8 and 9 are the transfer chambers 11 and 12. Within the tubes 8 and 9 are angle bars which form tracks and guides for the lower hoist cars, and they extend out through the lower open ends 13 and 14 of the tubes 8 and 9, and are attached to the rotatable handling table 15 which is mounted to turn on the rollers 16.

As will be explained more in detail hereafter, ammunition from the magazine room 10 is placed upon lower hoist cars when said cars are on table 15 and they are then elevated through tubes 8 and 9 to the transfer chambers 11 and 12. The ammunition is then transferred from the lower hoist cars to the upper hoist cars which run on tracks 17, 18 leading in a curved path to the breeches of the guns where the ammunition is transferred from the upper hoist cars to the guns.

It will be understood that the two separate sets of elevating mechanism inclosed in the two separate tubes 8 and 9 are necessary to supply ammunition to the two guns in the turret, and that these two sets are substantially alike and operate independently, one supplying the right gun and the other the left gun. Separate upper hoist cars running on separate tracks take the ammunition from the transfer room to the two guns. To get a clear idea of the invention therefore it is only necessary to describe the elevating mechanism for one gun.

We have shown in the drawings a peculiar and novel arrangement of tracks and elevating means for the lower hoist cars, as will be seen by reference to Fig. 2. Two hoist cars are used and they are attached to the ends of chains 19 passing over sprocket wheels 20, 21 on shaft 22 which is mounted on top of the transfer chamber 12. The length of these chains is such that when one car is in the transfer chamber the other rests upon the supports 23 on table 15 in the magazine room, and thus when the ammunition is being transferred from one car the other car is being loaded in the magazine room. It will also be apparent that when one car commences to ascend the other commences to descend, and that they will pass each other about midway the length of tube 9. To economize space and at the same time to permit the cars to pass each other without interference the tube 9 is made no wider at its ends than is necessary for the passage of a single car, but is enlarged at its central portion sufficiently to permit the two cars to pass each other. To this end also the cars are constructed to fold into a narrow space, and the tracks upon which they run are so constructed as to automatically fold the cars as they enter the tube 9. The tracks and engaging means on the cars furthermore are such that one car always runs in close proximity to one wall of tube 9 and the other car in close proximity to the opposite wall, and thus they do not interfere in passing. As will be seen by reference to Fig. 2, there is a single guide groove or track 24 upon each side in the transfer chamber 12, and that this merges into two gradually separating grooves 25, 26, as it enters tube 9, and that these two grooves again merge into a single groove 27 as they leave the lower end 14. Guide rollers on the cars work in these grooves and thus the two cars are brought into exactly the same position in the transfer chamber and in the magazine room although they follow different courses within tube 9. The cars are kept folded or closed when within tube 9 by the contact of rollers thereon with the tracks 28, 29, as hereinafter described. The shaft 22 is operated by an electric motor 30 through sprocket wheels 31, 32 and chain 33, or it can be operated by hand mechanism in the magazine room. Such hand operated mechanism may consist of shaft 34 operating the sprocket chain 35 and being operated by a pull upon the chains 36 passing over chain wheels 37.

The two lower hoist cars for any one hoisting mechanism are alike in their main features of construction but have specific differences which adapt them to travel in the different courses in tube 9. The car shown in Figs. 3 and 4 is the one which travels on the outer side of the tubes 8 and 9 and follows the guide groove 26, the particular car here shown being the one which travels in tube 8. The car shown in Fig. 5 travels on the inner side of tube 9 following the groove 25. These cars are made up of the two main sections 38 and 39 which are connected by the link arms 40, 41 and 42. The section 38 may be termed the stationary section, since it is the one which engages the track and is held against lateral motion, while section 39 swings with reference to it on the link arms into the open position shown in Figs. 4 and 5 or into the closed position shown in Figs. 6 and 7. Section 38 carries the inclined projectile tube 43 and 39 carries the two inclined powder tubes 44, 45. These tubes are inclined to the horizontal sufficiently to make it an easy matter to push the charges out of the lower end when it is desired to transfer them. When folded the three tubes are in vertical line. The end plates 46, 47 of the projectile section are connected by the tube 43, the rod 48 and the angle bar 49. It will be noted that the end plate 46 partially covers the lower ends of the powder tube when the car is folded, and thus prevents the powder from accidentally sliding out of those tubes during transit. The plate 47 is cut away as indicated in dotted lines in Figs. 4 and 6 to permit the ammunition to be inserted through the upper ends of the tubes. The link arm 42 has secured to its end a projection or arm 50 which when the car is folded stands across the lower end of the projectile tube 43 and thus prevents the projectile from sliding out.

In the car shown in Fig. 4 the section 38 is provided with rollers 51 which travel in the guide grooves 24, 26, and adjacent these rollers are the lugs 52 which engage the outer side bar 53 of the groove 26, and thus make the car follow the groove 26 instead of groove 25. The link arms 40, 41 at the upper part of the car have extensions 54, 55 which carry upon their ends the rollers 56, 57. These rollers occupy the position shown in Fig. 6, when the car is folded, and by engagement with track 29, keep the car folded during its passage through tube 8. The roller 58 on the lower end of section 39 engages the upper curved cam portion 59 of track 28 (Figs. 2 and 14) as the car starts to descend, and thus raises that section and folds the car and brings rollers 56, 57 into position to engage track 29. It will be noted therefore that as the car enters the transfer chamber 12 it automatically by its own weight opens to the position shown in Fig. 4, and that as it leaves that chamber in its descent it automatically folds. The opening or swinging movement of the movable section of the car is limited, as shown, by the arms 42 engaging the tube 43 of the relatively stationary section 46, see Figs. 4 and 5.

The car shown in Fig. 5 is provided with rollers 60 which run in tracks 24, 26, and adjacent these rollers are lugs 61 which engage the rail 62 and thus guide the rollers into track 25 instead of track 26. The section 39 of this car also has rollers 58 which engage the curved portion 59 of track 28 to fold the car and also engage that track to hold the car folded during its passage through tube 9. The elevating chains are attached to the car at 64, and in the form shown in Fig. 4 the chains are attached to lugs 65.

An enlarged view of the transfer chamber 12 is shown in Fig. 9. This chamber is provided with spring stops 66 for properly positioning the cars which are brought up into it. At one end of this chamber are three openings in wall 71 corresponding in position to the lower ends of the ammunition tubes 43, 44 and 45 when the car is in its open position in the chamber. Three short tubes 67, 68 and 69 corresponding in size and inclination to those in the car lead from these openings to the inclined plate 70 which crosses the tubes at right angles. These tubes are for the passage of the ammunition, and it is to be understood that the ammunition is to be forced from the car through these tubes by any suitable means which may be a hand operated rammer. The lower ends of the tubes in the car are unobstructed when the car is open, as shown in Fig. 4, and the inclination of the tubes makes it easy to push the ammunition out through the lower ends. The ends of the tubes 67, 68 and 69 next to wall 71 of the transfer chamber are normally closed by a sliding plate or door 72, see Fig. 10, which fits closely narrow slots or openings in the tubes. The plate or door 72 is held in close contact with plate 71 by the guides 73, 74, and is carried by the arms 75 and 80 pivotally supported at 76 and 81 respectively and pivotally connected to the plate at points 77 and 80ᵃ. The plate is given positive motion into closed or open position by the arm 75, this arm being in turn operated by the curved cam arm 78 which has in its outer straight end the groove 79. The arm 78 moves in the plane of plate 70 and arm 75 in plane of plate 71. Arm 78 has an extension 160 which engages the lugs 158, 159 on arm 75 thus causing it to rotate around support 76 and allowing for the different planes of motion. The shaft 81 extends across the chamber and a weighted arm 82 is adapted to be connected thereto, although it is normally disconnected therefrom. This arm has a spring pressed catch 83 which engages in notches in the segment 84. This arm provides a means of opening and closing door 72 by hand in case of disarrangement of the operating arm 78. The plate 70 is made straight with a smooth outer surface so that the upper hoist car may make close contact therewith without leaving any opening for the passage of flame. This plate is provided with the irregular groove 85 for a purpose hereafter explained in connection with the upper hoist car. The arm 78 is operated by the upper car as it ascends or descends the operation being such that the plate 72 is in open position when the upper car is in position against plate 70 and is closed when the upper car leaves that plate. The openings in plate 71 leading into the short tubes 67, 68 and 69 are therefore closed except when the upper hoist car is in position to receive the ammunition therefrom and as hereafter explained the upper car then acts as a closure.

The upper hoist car 86 runs on tracks 17, 18 which lead from the breech of the gun to a point just in front of the plate 70 of the transfer chamber and at that point are parallel to plate 70. This car is elevated by a cable 87 attached thereto which cable is operated by any suitable means. The car 86 has a smooth end plate 88 which makes close contact with plate 70 when it is in its lowered position. There are in this plate two circular openings 89, 90 which correspond in position to the ends of short tubes 67, 68 so that the powder charges may be pushed directly from said tubes into car 86, and while being transferred will not be exposed to any accidental flame or sparks. The shelf or support 91 is in position to receive the projectile from tube 69.

The upper powder charge inserted through opening 89 is supported on the swinging shelves 92, 93, which form a complete closure beneath the powder, and it is to be understood that the car is provided with top and side walls completely inclosing the charge. The shelves are pivotally supported upon rods 94, 95 extending lengthwise of the car and these rods have secured upon their ends farthest from plate 88 and outside the car detent arms 96, 97 which are held in position to support the shelves in closed position by pivoted latch 98. This latch is supported on lug 99 on the closed end 100 of the car. The lower powder charge inserted through opening 90 rests upon the fixed inclined partition 101 and is supported at the lower side by pivoted door 102 which is curved and constitutes a complete and tight closure between partition 101 and the front wall of the car. The door 102 is pivotally mounted on rod 103 which extends through the end wall of the car and is there provided with a detent arm 104. This detent arm when in closed position engages the catch 105 which is on the lower end of the vertically movable rod 106. This rod is operated by handle 109 and slides in the ears 99 and 107 and is normally supported by spring 108. When the lower powder charge is in position resting against door 102 and the catch 105 is pressed down to release the detent 104 the weight of the powder presses the door 102 down on shelf 91 and the powder charge consequently rolls down into that shelf. The shelves 92, 93 are held closed by springs 110 but when the detents 96, 97 are released from catch 98 these shelves fall apart by reason of the weight of the powder charge on them and permit that charge to pass through to partition 101 and out to the support 91. The shelves 92, 93 are automatically closed by the springs 110 when released from the weight of the powder.

Within the car 86 and close against the end plate 88 are the swinging doors 111, 112 which close the openings 89, 90. The upper door 111 is operated by roller 113 which works in the irregularly shaped cam groove 85 in the end plate 70 of the transfer chamber when the car descends to a position in front of that chamber. The shape of the groove is such that the roller will be raised up and carried into groove 114 as the car descends thereby throwing the door 111 into the open position shown in dotted lines in Fig. 12, and as the car again ascends it will throw the roller into the closed position shown in full lines in Fig. 14. It will thus be apparent that the door 111 is automatically opened as the car comes into position for the transfer of ammunition from the lower hoist car, and that it is positively and automatically closed as the upper car leaves the transfer position. The lower door 112 is connected to door 111 by a link arm 115 and moves with it.

The upper car 86 is provided with a roller 116 which when the car descends enters the open end of groove 79 in arm 78, which groove then occupies a substantially vertical position as shown in Fig. 17, and as the car descends farther the roller moving in the groove turns the arm into the position shown in full lines in Fig. 10, thus opening the door 72 of the transfer chamber. As the car ascends the roller automatically and positively throws the arm into the vertical position and closes door 72. The door 102 is normally open when the car 86 is descending to receive a load and it is automatically closed as the car reaches the transfer chamber by roller 117 on the upright post 118 which stands on the floor in front of plate 70 of the transfer chamber.

The car 86 is provided with four rollers 119 at right angles to the length of the car which roll on tracks 17, 18 and with two rollers 120 parallel to the length of the car which roll in groove 121 and guide the car laterally. The cable 87 which elevates the car is secured to block 122 which may slide vertically a short distance in the guide-ways 123, and at its lower end this block has the enlargement 124 which abuts against the lower end of the guide-ways 123, and thus lifts the car. Extending downwardly from enlargement 124 is the rod 125 which passes through ear 126 secured to the car, and which has upon its lower end the knob 127. The coil spring 128 surrounds rod 125 and bears at its ends upon the parts 126 and 127 and thus tends to pull down the rod and the attached part 124. The purpose of this arrangement is to provide automatic means for preventing the car from falling in case the cable 87 breaks or the elevating machinery gets out of order, and to this end the slight vertical movement of the block 122 is made to operate a friction brake which in connection with the upper wheel 120 clamps the car to the track. This brake mechanism consists of the brake arm 129 pivotally connected to the car at 130 leaving a space between it and wheel 120 sufficiently wide to receive the side flange 131 of the track groove in which the wheel moves. This brake arm has a groove 132 in its surface facing flange 131 and this groove carries ball or roller 133 thus making a friction clutch. The free end of arm 129 is connected by link 134 to enlargement 124 and thus upon breakage of the rope 87 the spring 128 will throw the clutch into operation and prevent the descent of the car. When the car 86 moving up on tracks 17, 18, reaches a proper position at the breech of the gun, the lug 135 comes in contact with lug 136 on block 137 attached to the breech of gun 138 and thus makes the car stop in proper position for transfer of the ammunition to the gun. In the block 137 below lug 136 is a spring catch 139 which engages under lug 135 thus holding the car firmly in position.

A sliding rod 140 is mounted in a bearing 141 just below lug 135 and is thus in position to push against the end of the spring catch 139. This rod is moved lengthwise by the angle piece 142 pivoted to the car at 143, which angle piece is connected by link 144 to the operating lever 145 pivoted at 146 and provided with operating handle 147 at the opposite end of the car. The handle 147 is normally held in an elevated position by spring 148 which spring however is not so strong as the spring supporting catch 139 and as a consequence the tension of spring 148 will not be sufficient to force catch 139 out of operative engagement with lug 135. It will be understood however that handle 147 may be raised by hand thus pushing catch 139 out of engagement and permitting the car to descend. The handle and connected parts normally occupy the position as shown in dotted lines in Fig. 15, when the car is not at the breech of the gun.

Pivotally connected to the link arm 144 is a swinging piece 149 pivoted at its upper end to lug 126 and having at its lower end a curved horizontal ear 150 which may be turned to occupy a position directly beneath the enlarged lower end 127 of rod 125. This ear therefore when in the position shown in full lines in Fig. 13 prevents rod 125 from descending and thus prevents the clutch arm 129 from acting. At this time the car is positively supported by lug 139 and there is no necessity for the operation of the friction clutch. In fact it is not desirable to have the brake operate when the car is supported by the spring catch and the tension on the cable is released and it is for this reason that means is provided for preventing such operation.

The angle piece 142 has secured thereto a link arm 151 which is connected to the end of elbow lever 152 which projects through slot 153 in the side wall of the car. The loading tray 154 is controlled by suitable connecting mechanism from the elbow lever 152. The catch 155 normally holds the tray in position on the car but is released by the movement of rod 140 by catch 139 or by the operation of handle 147. The loading tray and its mounting constitute no part of the present invention. The tray may be constructed, for instance, as shown in our Patent No. 895,481, dated August 11, 1908.

It is believed that the functions of the various parts and the operation of the device will be clear from the above description and therefore a brief statement thereof will be sufficient.

Starting with one of the lower hoist cars on the loading table 15 in the magazine room 10 and the other in the transfer chamber 12, and with the upper hoist car 86 at the breech of the gun, the operation is as follows: The projectile and two powder charges are placed in the inclined tubes 43, 44 and 45 through the upper ends, it being understood that the car is then in folded position as shown in Figs. 6 and 7, and those charges are prevented from sliding out at the lower ends of the tubes by plate 46 and arm 50. The motor 30 is then set in operation to elevate the car and as the loaded car commences to ascend the empty car in the transfer chamber commences to descend and is automatically folded. The two cars pass midway of tube 9 and as the loaded car enters the transfer chamber 12 it automatically unfolds by its own weight and the weight of the ammunition, and assumes the position shown in Figs. 4 and 5 in which the plate 46 and arm 50 no longer prevent the charges from passing out the lower ends of the tubes. The stops 66 properly position those tubes in line with the short tubes 67, 68 and 69 of the transfer chamber, but at this time tubes 67, 68 and 69 are closed by door 72 so that there is no open communication between the charges and the portion of the turret where the gun is. The single upper hoist car 86 is then lowered to the position shown in Fig. 1 where its end plate 88 makes close contact with plate 70. In descending the roller 116 enters the groove 79 in arm 78 thus throwing that arm into the position shown in Fig. 10, and opening door 72 so that the charges may pass freely through tubes 67, 68 and 69. At the same time roller 113 of the swinging doors on the upper car 86 engages groove 85 thus opening these doors and permitting the ammunition to enter the car through openings 89, 90. Before these doors are opened the roller 117 strikes the swinging door 102 and closes it. The ammunition is then pushed by a hand rammer or other means, from the car in the transfer chamber through tubes 67, 68 and 69 into the upper hoist car 86. While the upper and lower hoist cars are thus in communication the upper car is completely closed otherwise and cuts off all communication between the gun chamber and the magazine room. As the car 86 after being loaded leaves the transfer chamber the doors, 111, 112 in it and the door 72 of the transfer chamber are positively closed and thus communication with the magazine room is still shut off and the powder in car 86 is completely inclosed and protected. When the car 86 reaches the breech of the gun as shown in Fig. 13 the projectile resting upon support 91 is pushed into the gun by any suitable rammer. The handle 109 is then depressed releasing door 102 and allowing the lower powder charge to roll down upon support 91 from which it is pushed home in the gun by the rammer. The catch 98 is then released allowing the swinging shelves 92, 93 to open under the weight of the upper powder charge and allowing that charge to fall and to roll out upon support 91 ready to be forced home in the gun. To allow car 86 to descend the handle 147 is elevated by hand, thus depressing catch 139 and releasing lug 135. The weight of car 86 on cable 87 is sufficient to compress spring 128 and keep block 122 in elevated position and the friction clutch of arm 129 out of operation. If however the cable breaks the weight of the car is no longer transmitted to spring 128 and that spring expands instantly, thus drawing down part 124 and operating the friction clutch to prevent the car from falling.

In the rapid handling of explosives by elevators or conveyers, as ordinarily constructed, there is danger of the explosive becoming ignited from sparks produced by friction or the striking of one surface upon another. To obviate this we prefer to line or cover the surfaces of all parts of the hoist or conveyer which would otherwise be likely to produce sparks with material, such as rubber, raw hide or copper, from which a spark cannot be struck, even by a piece of steel. Thus the various guide wheels or rollers of the cars are covered preferably with raw hide R, as shown in Figs. 7 and 8. The projectile shelf 19 of the upper ammunition car is also preferably covered with raw hide or similar substance R' to prevent the production of sparks by friction in pushing the projectile from it. The face of the latch 139 we preferably cover with copper C for the same purpose and the face on the stop 136 is preferably provided with a pad $R^2$ of rubber or raw hide. In like manner we protect one of each pair of parts which come in contact with a possibility of producing fire or sparks through friction.

It will be noted that the powder charges are completely protected at all times except when in the act of entering the gun, and that the magazine room is always completely shut off from the gun chamber. It will be noted furthermore that the section $6^a$ of the transfer room is in the shape of a closed well with merely a hole in the top for the entry of the upper hoist car and that there will be little tendency for flame or sparks in the gun chamber to enter this well and consequently very slight tendency of such flame or sparks to enter the transfer chamber 12 through the openings for the transfer of the ammunition. However, these openings are at all times practically closed by either the door 72 or the upper cage. Thus a double safeguard is provided.

Having thus described our invention, what we claim is,

1. The combination with a gun, of an ammunition hoist car adapted to approach the breech of said gun having supports for the projectile and powder charges, a loading tray below the projectile support, a spring catch attached to the gun for automatically engaging and supporting the car, a catch for holding the loading tray in position, and means operated by the catch on the gun for releasing said tray.

2. The combination with a gun, of a magazine room below the gun, a transfer chamber provided with openings for the passage of ammunition charges, means for normally closing said openings, lower hoist cars for conveying ammunition from the magazine room to the transfer room, an upper hoist car with normally closed powder chambers adapted to fit closely against said transfer chamber in line with said openings, and automatic means for opening the powder chambers of the upper hoist car in line with the openings in the transfer chamber whereby the ammunition may be transferred from said chamber to said car.

3. In an apparatus for hoisting ammunition the combination with a gun chamber, of a magazine room, lower hoist cars, an upper hoist car, a transfer chamber, means for elevating the lower cars from the magazine room to the transfer chamber, means for transferring ammunition from the lower cars directly to the upper car, and automatically operated means for cutting off communication between the powder chambers of said cars and the gun chamber at all times until said charges are being rammed into the gun.

4. The combination with a gun, of a magazine room below the gun cut off from communication therewith, a transfer chamber between said room and gun provided with openings therein for the passage of ammunition charges, a door for closing said openings, means for operating said door, an upper hoist car adapted to travel from a position in front of said openings in the transfer chamber to the gun, and means on said car for engaging the operating means upon the door to open it as the car approaches the transfer chamber.

5. The combination with a gun, of a magazine room below the gun cut off from communication therewith, a transfer chamber between said room and gun provided with openings therein for the passage of ammunition charges, a door for closing said openings, means for operating said door, an upper hoist car adapted to travel from a position in front of said openings in the transfer chamber to the gun, means on said car for engaging the operating means upon the door to open it as the car approaches the transfer chamber and to close the door as the car leaves the transfer chamber.

6. In a device of the class described the combination with a closed chamber having inclined tubular openings in one wall for the passage of ammunition, a sliding door for closing said tubular openings, a hoist car adapted to approach said chamber at said openings, means operated by the car for opening said door as the car approaches the chamber and means for transferring ammunition to the car through said openings.

7. In a device of the class described the combination with a closed chamber having an opening in one wall for the passage of ammunition, a sliding door for closing said opening, a hoist car adapted to approach said chamber at said opening, means operated by the car for opening said door as the car approaches the chamber and for closing said door as the car recedes in the reverse direction, and means for transferring ammunition to the car through said opening.

8. In a device of the class described the combination with a closed chamber having an opening in one wall for the passage of ammunition, a sliding door for closing said opening, a hoist car adapted to approach said chamber at said opening, said car having a normally closed door, means operated by the car for opening said sliding door as the car approaches the chamber, and automatic means for simultaneously opening the door of said car in line with said openings in the chamber.

9. In a device of the class described, the combination with a closed chamber having an opening in one wall for the passage of ammunition, a sliding door for closing said opening, a hoist car adapted to approach said chamber at said opening, said car having a normally closed door, means operated by the car for opening said sliding door as the car approaches the chamber, automatic means for simultaneously opening said car door in line with said openings in the chamber, said sliding door and car door being automatically closed as the car leaves the chamber.

10. In a device of the class described, the combination with a closed chamber one end wall of said chamber being provided with a smooth outer surface and with an opening for the passage of ammunition, of a sliding door for closing said opening, a cam arm for operating said door, a closed hoist car having a smooth outer surface at one end adapted to fit closely against the smooth end of the chamber, the said end of the car being provided with an opening for the passage of ammunition, a door for said opening, a track for guiding the car across the end of the chamber, means on the car for engaging and operating said cam arm, and a cam groove on the wall of the chamber for operating the door of the car.

11. In a device of the class described, the combination with a closed chamber having an opening at one end for the passage of ammunition, of a closed hoist car adapted to fit the outer surface of said end closely, means for guiding said car across said end and into alinement with the opening therein, a sliding door for the opening in said chamber working in guides, a curved pivoted arm connected to said door for operating it and provided with a groove, a roller on the car adapted to enter said groove and to thereby turn the arm upon its pivot to open the door as the car comes opposite the opening and to positively close said door as the car leaves the opening.

12. In a device of the class described, the combination with a closed chamber having an opening at one end for the passage of ammunition, of a closed hoist car adapted to fit the outer surface of said end closely, means for guiding said car across said end and into alinement with the opening therein, a sliding door for the opening in said chamber working in guides, a curved pivoted arm connected to said door for operating it and provided with a groove, a roller on the car adapted to enter said groove and to thereby turn the arm upon its pivot to open the door as the car comes opposite the opening and to positively close said door as the car leaves the opening, a sliding door for the end of the car, and a roller on said car door adapted to engage a cam groove on the wall of the chamber, whereby the car door is opened when it comes into line with the opening in the chamber and is closed as it leaves said opening.

13. In a device of the class described, the combination with a gun, of a magazine room, lower hoist cars, an upper hoist car, a transfer chamber, means for preventing communication between the gun and the magazine room and transfer chamber, a passageway leading from the magazine room to the transfer chamber in which the lower hoist cars move, inclined ammunition supports in the lower hoist cars, short inclined tubes passing through the wall of the transfer chamber, adapted to be alined with the lower ends of the supports in the lower hoist cars, and means for closing said tubes.

14. In a device of the class described, the combination with a gun, of a magazine room, lower hoist cars, an upper hoist car, a transfer chamber, means for preventing communication between the gun and the magazine room and transfer chamber, a passageway leading from the magazine room to the transfer chamber in which the lower hoist cars move, inclined ammunition supports in the lower hoist cars, short inclined tubes passing through the wall of the transfer chamber adapted to be alined with the lower ends of the supports in the lower hoist cars, means for closing said tubes, and guide tracks and stops for bringing the supports of the car into alinement with the tubes.

15. In a device of the class described, the combination with a gun, of a magazine room, lower hoist cars, an upper hoist car, a transfer chamber, means for preventing communication between the gun and the magazine room and transfer chamber, a passage-way leading from the magazine room to the transfer chamber in which the lower hoist cars move, inclined ammunition supports in the lower hoist cars, short inclined tubes passing through the wall of the transfer chamber adapted to be alined with the lower ends of the supports in the lower hoist cars, means for closing said tubes, and inclined guide tracks for bringing the upper hoist car close against the lower end of the inclined tubes whereby the ammunition may be easily transferred from the lower cars to the upper cars.

16. In a device of the class described, the combination with a gun, of a transfer chamber, an upper hoist car adapted to travel between said chamber and gun, a door in said car, and means adjacent the transfer chamber for closing said door as the car approaches the chamber.

17. In a device of the class described, the combination with a gun of a transfer chamber, of a closed upper hoist car adapted to travel between said chamber and gun, a door in said car for admitting ammunition, a door for discharging ammunition, and means adjacent the transfer chamber for closing said last mentioned door as the car approaches said chamber.

18. In a device of the class described, the combination with a gun of a transfer chamber, of a closed upper hoist car adapted to travel between said chamber and gun, a door in said car for admitting ammunition, a door for discharging ammunition, a roller on a fixed support adjacent the transfer chamber for engaging said last mentioned door and positively closing it, and an automatic catch for retaining the door closed.

19. In a device of the class described, the combination with a gun, of a magazine room, a transfer chamber normally closed against communication with the gun, lower hoist cars entering said chamber and provided with separate ammunition supports, an upper hoist car having similarly arranged ammunition supports, an end wall of the transfer chamber being provided with openings corresponding in relative position to the said ammunition supports, automatically operated means for covering and uncovering said openings, and means for bringing said cars into position upon opposite sides of said wall with the supports in line with said openings.

20. In a device of the class described, the combination with a gun, of a magazine room normally cut off from communication with the gun, a transfer chamber, lower hoist cars entering said chamber and provided with separate ammunition supports, an upper hoist car having similarly arranged ammunition supports, an end wall of the transfer chamber being provided with openings corresponding in relative position to the said ammunition supports, automatic means for covering and uncovering said openings, means for bringing said cars into position upon opposite sides of said wall with the supports in line with said openings, whereby the several charges may be transferred directly from the lower cars to the upper car without exposure, and means for automatically closing the powder chambers of the upper car to protect the charges therein.

21. In an apparatus for hoisting ammunition, the combination with a magazine room, of a transfer room, a vertical passage-way between said rooms, two foldable hoist cars traveling in said passage-way secured to a hoisting cable passing over a shaft whereby one car ascends as the other descends, guide tracks for said cars in the transfer room, said tracks diverging below the transfer room, means for folding said cars into narrow space as they leave the transfer room and for maintaining them folded within the passage-way, and means for making the two cars take different tracks when they leave the transfer room, whereby the two cars may pass each other between said rooms.

22. An ammunition hoist car composed of two sections hinged together by means of links whereby they may fold into a narrow space, one of said sections being relatively stationary and provided with a projectile support and the other section being relatively movable and provided with powder charge supports.

23. An ammunition hoist car composed of two sections hinged together to fold into narrow space and provided with separate inclined charge supports, and means for automatically preventing the charges from sliding off the supports when the car is folded.

24. An ammunition hoist car composed of two sections hinged together to fold into narrow space and provided with separate inclined charge supports, and stops adapted to be projected across the lower ends of said supports when the car is folded.

25. An ammunition hoist car composed of two sections hinged together to fold into narrow space and provided with separate inclined charge supporting tubes, and stops on the car adapted to be projected across the lower ends of the tubes by the folding of the car.

26. In an ammunition hoist car, the combination with a section for containing the powder charges, of a section for containing the projectile, supporting means connected to the last mentioned section, and guide rollers thereon, parallel link arms connecting the sections whereby they may fold together but will by gravity assume a position side by side, and a stop for limiting the downward movement of the powder section when the car unfolds.

27. In an ammunition hoist car, the combination with a narrow section having supports longitudinally thereof for the powder charges, of a narrow section having a support for the projectile longitudinally thereof near the bottom, the said sections being so constructed that the powder section may fit within the upper part of the projectile section, parallel link arms connecting the sections extending upwardly from the projectile section whereby the sections may separate by the weight of the powder section, and means on the projectile section for limiting the downward motion of the powder section relatively to the projectile section.

28. In an ammunition hoist car, the combination with a narrow section having tubes longitudinally thereof for the powder charges, of a narrow section having a tube for the projectile longitudinally thereof near the bottom, the said sections being so constructed that the powder section may fit within the upper part of the projectile section with its tubes above the projectile tube, parallel link arms connecting the sections extending upwardly from the projectile section whereby the sections may separate by the weight of the powder section, two of said arms being in such position as to rest upon the projectile tube and support the powder section when in its lowered position.

29. In an ammunition hoist car, the combination with a section having inclined tubes longitudinally thereof for powder charges, of a section having a support for a projectile, link arm connection between said sections whereby they may assume a position side by side or may fold one into the other, and an end plate upon the projectile section adapted to project across and obstruct the lower ends of the powder tubes when the sections are folded.

30. In a car for hoisting ammunition, a movable section comprising end plates and two inclined tubes extending through said plates, one above the other, for supporting the powder charges, a fixed section comprising end plates and an inclined tube passing through said plates near the bottom for supporting the projectile, means for supporting the car secured to the fixed section, guide rollers on said section, link arms connecting said sections whereby they normally stand side by side, but may fold together with the tubes in vertical line and with an end plate of the fixed section extending across the lower ends of the powder tubes.

31. In a car for hoisting ammunition, a movable section comprising end plates and two inclined tubes extending through said plates one above the other for supporting the powder charges, a fixed section comprising end plates and an inclined tube passing through said plates near the bottom for supporting the projectile, means for supporting the car secured to the fixed section, guide rollers on said section, link arms connecting said sections whereby they normally stand side by side but may fold together with the tubes in vertical line, and with an end plate of the fixed section extending across the lower ends of the powder tubes, and an arm secured to one of the link arms adapted to project across the lower end of the projectile tube when the sections are folded.

32. An ammunition hoist car provided near the bottom with an exposed projectile support adapted to be brought into position at the breech of a gun and in line with the bore thereof, an inclosed powder chamber having a floor inclined downwardly toward the projectile support, a door hinged longitudinally of said powder chamber at the floor and adapted to close the said chamber and to turn down upon the projectile support when open so as to constitute a continuation of said inclined floor.

33. An ammunition hoist car provided near the bottom with an exposed projectile support adapted to be brought into position at the breech of a gun and in line with the bore thereof, an inclosed powder chamber having a floor inclined downwardly toward the projectile support, a door hinged longitudinally of said powder chamber at the floor and adapted to turn down upon the projectile support when open so as to constitute a continuation of said inclined floor, and adapted to project upwardly from said floor when closed whereby the powder charge in the chamber normally rests against it.

34. An ammunition hoist car provided near the bottom with an exposed projectile support adapted to be brought into position at the breech of a gun and in line with the bore thereof, an inclosed powder support having a floor inclined downwardly toward the projectile support, a door hinged longitudinally of said powder support at the floor and adapted to turn down upon the projectile support when open so as to constitute a continuation of said inclined floor, and adapted to project upwardly from said floor when closed whereby the powder charge on the support normally rests against it, and an automatic spring catch for holding the door closed.

35. An ammunition hoist car provided near the bottom with an exposed projectile support adapted to be brought into position at the breech of a gun and in line with the bore thereof, an inclosed powder support, a floor for said support composed of two longitudinally hinged meeting doors, releasable means for holding said doors closed, and means for guiding the powder charge released from this support to the projectile support.

36. An ammunition hoist car provided near the bottom with an exposed projectile support adapted to be brought into position at the breech of a gun and in line with the bore thereof, an inclosed powder support, a floor for said support composed of two longitudinally hinged meeting doors, springs for normally holding said doors closed, releasable means for positively holding said doors closed, and means for guiding the powder charge released from this support to the projectile support.

37. An ammunition hoist car provided near the bottom with an exposed projectile support adapted to be brought into position at the breech of a gun and in line with the bore thereof, an inclosed powder support, a floor for said support composed of two longitudinally hinged meeting doors, springs for normally closing said doors, detent arms secured to said doors outside the inclosed support, a latch for engaging said arms to positively hold the doors closed, and means for guiding the powder charge released from this support to the projectile support.

38. An ammunition hoist car provided along one side near the bottom with an exposed projectile support adapted to be brought into position at the breech of a gun and in line with the bore thereof, an inclosed powder support, an inclined passage-way from said powder support to the projectile support, a door for closing said passage-way, a second inclosed powder support above the first mentioned powder support, and means for discharging the powder from said second support into the first.

39. An ammunition hoist car provided along one side near the bottom with an exposed projectile support adapted to be brought into position at the breech of a gun and in line with the bore thereof, an inclosed powder support, and inclined passage-way from said powder support to the projectile support, a door for closing said passage-way, a second inclosed powder support above the first mentioned powder support, and hinged doors constituting the floor between said powder supports.

40. An ammunition hoist car provided near the bottom with an exposed projectile support adapted to be brought into position at the breech of a gun and in line with the bore thereof, an inclosed powder support, means for opening said inclosed support and discharging the powder charge upon the projectile support, a second inclosed powder support above the first mentioned powder support, and means for discharging the powder from said second support into the first.

41. In an ammunition hoist car, the combination with two longitudinal inclosed powder supports, of doors for closing the ends of said supports, connections between said doors whereby they move together, and a roller secured to one of said doors projecting beyond the surface of the car for operating said doors.

42. The combination with a gun, of an ammunition hoist car having supports for the powder charges and the projectile, means for elevating said car, guide tracks for said car leading to the breech of the gun, a lug on the gun, a lug on the car adapted to engage the gun lug and stop the car with its projectile support in line with the bore of the gun, a spring pressed catch below the lug on the gun adapted to engage under the lug on the car, a slide rod upon the car adapted to project beneath the lug thereon and depress said catch, and a handle connected with said slide rod for operating it.

43. The combination with a gun, of an ammunition hoist car, means for bringing said car into line with the breech of the gun, a spring catch on the gun for automatically engaging and supporting the car when it reaches the gun, a tripping device adapted to project from the car, and trip said catch, a handle on the opposite side of the car, operating mechanism connecting said handle and tripping device, and a spring connected to said mechanism tending normally to force the tripping device outward, the said spring being not so strong as that operating the catch.

44. The combination with a gun, of an ammunition hoist car adapted to approach the breech of said gun having supports for the projectile and powder charges, a loading tray below the projectile support, a catch for normally holding said tray in place, and means for automatically tripping said catch as the car reaches the gun.

45. The combination with a gun, of an ammunition hoist car adapted to approach the breech of said gun having supports for the projectile and powder charges, a loading tray below the projectile support, a spring catch attached to the gun for automatically engaging and supporting the car, a spring operated catch for holding the loading tray in position, operating means connected with said last mentioned catch having an element in position to be engaged and depressed by the spring catch on the gun whereby the loading tray is released as the car reaches its position at the breech of the gun.

46. The combination with a gun, of an ammunition hoist car adapted to approach the breech of said gun having supports for the projectile and powder charges, a loading tray below the projectile support, a spring catch attached to the gun for automatically engaging and supporting the car, a spring operated catch for holding the loading tray in position, operating means connected with said last mentioned catch having an element in position to be engaged and depressed by the spring catch on the gun whereby the loading tray is released as the car reaches its position at the breech of the gun, and a handle on the car connected with said operating means whereby the catch may be made to engage the tray and the spring catch on the gun may be positively depressed to release the car.

47. The combination with a gun, of an ammunition hoist car having supports for the powder charges and the projectile, means for elevating said car, guide tracks for said car leading to the breech of the gun, a lug on the gun, a lug on the car adapted to engage the gun lug and stop the car with its projectile support in line with the bore of the gun, a loading tray in said car below said projectile support, a catch for holding said tray in position, and means for automatically releasing said catch when the car reaches the gun.

48. The combination with a gun, of an ammunition hoist car having supports for the powder charges and the projectile, means for elevating said car, guide tracks for said car leading to the breech of the gun, a lug on the gun, a lug on the car adapted to engage the gun lug and stop the car with its projectile support in line with the bore of the gun, a spring pressed catch below the lug on the gun adapted to engage under the lug on the car, a slide rod upon the car adapted to project beneath the lug thereon and depress said catch, a handle connected with said slide rod for operating it, a loading tray in said car below said projectile support, and a catch for holding said tray in position operatively connected with said slide rod and handle.

49. The combination with a car, of a cable for elevating it, an element connecting said cable to the car having a limited vertical movement with reference to the car, a spring tending to force said element to its lower position and being too weak to support the weight of the car, a brake for preventing the descent of the car, connections between said element and brake whereby the brake is applied as the element descends with reference to the car, a positive catch for supporting the car, and means for preventing the operation of the brake when the car is supported by said catch.

50. The combination with a car, of a cable for elevating it, an element connecting said cable to the car having a limited vertical movement with reference to the car, a spring tending to force said element to its lower position and being too weak to support the weight of the car, a brake for preventing the descent of the car, connections between said element and brake whereby the brake is applied as the element descends with reference to the car, a positive spring catch for supporting the car, and means operated by said catch for preventing the operation of the brake when the car is supported by said catch.

51. The combination with a car, of a cable for elevating it, a brake for preventing the descent of the car, means for automatically operating said brake when the pull upon the cable connection is released, a positive support for said car, and means for preventing the operation of the brake when the car is supported by said positive means.

52. The combination with a gun, of an ammunition hoist car, a guide track for said car leading to the gun, a cable for elevating said car, a friction brake for preventing the descent of the car, means for automatically operating said brake when the pull upon the cable is released, a spring catch at the gun for positively supporting the car, a stop for positively preventing the operation of the brake, a loading tray carried by said car, a catch for holding said tray in position, operating mechanism upon the car having an element adapted to project in the path of the spring catch at the gun and to be moved thereby, a spring connected to the mechanism tending to oppose this motion, connections between said operating mechanism, catch for the loading tray and stop for the brake whereby the loading tray is released and the brake thrown out of operation when the spring catch supports the car, and a handle for operating said mechanism.

In testimony whereof we affix our signatures in presence of two witnesses.

JOHN F. MEIGS.
ROBERT P. STOUT.

Witnesses:
EDWIN A. MILLER,
HARVEY L. NIESS.

Copies of this patent may be obtained for five cents each, by addressing the "Commissioner of Patents, Washington, D. C."